(12) United States Patent
Evans et al.

(10) Patent No.: US 12,104,720 B2
(45) Date of Patent: Oct. 1, 2024

(54) TORQUE SHOULDER OF A PREMIUM CONNECTION

(71) Applicant: ARCELORMITTAL TUBULAR PRODUCTS LUXEMBOURG S.A., Luxembourg (LU)

(72) Inventors: Merle E. Evans, Houston, TX (US); Jeroen Stijn Juliaan Van Wittenberghe, Zelzate (BE)

(73) Assignee: ARCELORMITTAL TUBULAR PRODUCTS LUXEMBOURG S.A., Luxembourg (LU)

( * ) Notice: Subject to any disclaimer, the term of this patent is extended or adjusted under 35 U.S.C. 154(b) by 386 days.

(21) Appl. No.: 16/931,465

(22) Filed: Jul. 17, 2020

(65) Prior Publication Data
US 2020/0370682 A1  Nov. 26, 2020

Related U.S. Application Data

(62) Division of application No. 15/449,350, filed on Mar. 3, 2017, now abandoned.

(51) Int. Cl.
*F16L 15/00* (2006.01)
*E21B 17/042* (2006.01)

(52) U.S. Cl.
CPC .......... *F16L 15/002* (2013.01); *E21B 17/042* (2013.01); *F16L 15/001* (2013.01); *F16L 15/004* (2013.01)

(58) Field of Classification Search
CPC ....... F16L 15/00; F16L 15/001; F16L 15/002; F16L 15/004; F16L 15/08; E21B 17/042; E21B 17/043
See application file for complete search history.

(56) References Cited

U.S. PATENT DOCUMENTS

| 3,224,799 A | 12/1965 | Blose et al. |
| 3,359,013 A | 12/1967 | Knox et al. |
| 3,870,351 A | 3/1975 | Matsuki |

(Continued)

FOREIGN PATENT DOCUMENTS

| CA | 2701417 A1 | 4/2009 |
| CN | 2351541 Y | 12/1999 |

(Continued)

*Primary Examiner* — James M Hewitt, II
(74) *Attorney, Agent, or Firm* — Davidson Kappel LLC (57) ABSTRACT

A threaded tubular connection includes a pin having external threads, a pin seal surface, and a pin torque shoulder at a free end and a box for receiving the pin, the box having internal threads for interacting with the pin threads, a box seal surface for contacting the pin seal surface and a box torque shoulder for contacting the pin torque shoulder. The pin and box define a longitudinal axis. The pin torque shoulder has a first pin shoulder surface and a second pin shoulder surface, the first pin shoulder surface intersects an axis perpendicular to the longitudinal axis at a first angle and the second pin shoulder surface intersects the perpendicular axis at a second angle. The box torque shoulder has a first box shoulder surface and a second box shoulder surface. The first box shoulder surface intersects an axis perpendicular to the longitudinal axis at a third angle and the second box shoulder surface intersects the perpendicular axis at a fourth angle.

10 Claims, 8 Drawing Sheets

(56) References Cited

U.S. PATENT DOCUMENTS

| | | |
|---|---|---|
| 4,377,302 A | 3/1983 | Kohyama et al. |
| 4,384,737 A | 5/1983 | Reusser |
| 4,433,862 A | 2/1984 | Raulins |
| 4,537,429 A | 8/1985 | Landriault |
| 4,550,937 A | 11/1985 | Duret |
| 4,623,173 A | 11/1986 | Handa et al. |
| 4,624,488 A | 11/1986 | Furgerson |
| 4,629,224 A | 12/1986 | Landriault |
| 4,732,416 A | 3/1988 | Dearden et al. |
| 4,795,200 A | 1/1989 | Tung |
| 5,137,310 A | 8/1992 | Noel et al. |
| 5,769,466 A | 6/1998 | Noel et al. |
| 6,045,165 A | 4/2000 | Sugino et al. |
| 6,047,997 A * | 4/2000 | Olivier .............. E21B 17/042 285/333 |
| 6,206,436 B1 | 3/2001 | Mallis et al. |
| 6,311,790 B1 | 11/2001 | Beckwith et al. |
| 6,511,102 B2 | 1/2003 | Krug et al. |
| 7,334,821 B2 | 2/2008 | Dutilleul et al. |
| 7,690,696 B2 | 4/2010 | Mallis et al. |
| 7,699,361 B2 | 4/2010 | Verger et al. |
| 7,823,931 B2 | 11/2010 | Hamamoto et al. |
| 8,011,698 B2 | 9/2011 | Verger et al. |
| 8,038,179 B2 | 10/2011 | Takano et al. |
| 8,287,008 B2 | 10/2012 | Charvet-Quemin et al. |
| 8,485,563 B2 | 7/2013 | Patureau et al. |
| 8,641,100 B2 | 2/2014 | Patureau et al. |
| 8,840,151 B2 | 9/2014 | Hignett et al. |
| 8,894,101 B2 | 11/2014 | Pallini, Jr. |
| 9,273,521 B2 | 3/2016 | Martin et al. |
| 9,568,125 B2 | 2/2017 | Yamaguchi et al. |
| 10,316,995 B2 | 6/2019 | Gillot et al. |
| 2002/0021006 A1 | 2/2002 | Mallis |
| 2003/0075924 A1 | 4/2003 | Huey et al. |
| 2005/0133223 A1 | 6/2005 | Harrall et al. |
| 2009/0152008 A1 | 12/2009 | Andis et al. |
| 2010/0283239 A1 | 11/2010 | Gillot |
| 2010/0301603 A1 | 12/2010 | Beigneux et al. |
| 2011/0025051 A1 | 2/2011 | Yamaguchi et al. |
| 2011/0241339 A1 | 10/2011 | Verger et al. |
| 2014/0145433 A1 | 5/2014 | Hou et al. |
| 2014/0217725 A1 | 8/2014 | Juarez et al. |
| 2015/0061287 A1 | 3/2015 | Yoshikawa et al. |
| 2015/0145247 A1 | 5/2015 | Zhu et al. |
| 2018/0223609 A1 * | 8/2018 | Ruehmann ............ E21B 17/042 |
| 2018/0252342 A1 | 9/2018 | Evans et al. |
| 2018/0259098 A1 | 9/2018 | Evans et al. |

FOREIGN PATENT DOCUMENTS

| | | |
|---|---|---|
| CN | 1617994 A | 5/2005 |
| CN | 201121782 Y | 9/2008 |
| CN | 201310305 Y | 9/2009 |
| CN | 201318513 Y | 9/2009 |
| CN | 101595272 A | 12/2009 |
| CN | 201620767 U | 11/2010 |
| CN | 101910548 A | 12/2010 |
| CN | 101975035 A | 2/2011 |
| CN | 102678065 A | 9/2012 |
| CN | 202755913 U | 2/2013 |
| CN | 203081334 | 7/2013 |
| CN | 103321585 A | 9/2013 |
| CN | 204082029 U | 1/2015 |
| CN | 106089119 A | 11/2016 |
| CN | 107407447 | 11/2017 |
| DE | 4446806 C1 | 5/1996 |
| EA | 200800557 A1 | 6/2008 |
| EA | 201170902 A1 | 12/2011 |
| EA | 201290969 A1 | 3/2013 |
| EP | 1046779 A1 | 10/2000 |
| EP | 1179700 A2 | 2/2002 |
| EP | 2770239 A1 | 8/2014 |
| JP | S58193993 A | 11/1983 |
| JP | H0587275 A | 4/1993 |
| JP | H09152067 A | 2/1997 |
| JP | 3287197 B2 | 5/2002 |
| JP | 2005240888 A | 9/2005 |
| JP | 2009505003 A | 2/2009 |
| JP | 2013511672 A | 4/2013 |
| JP | 2020509315 A | 3/2020 |
| RU | 42283 U1 | 11/2004 |
| RU | 2439416 C1 | 1/2012 |
| RU | 2471058 C2 | 12/2012 |
| RU | 124352 U1 | 1/2013 |
| RU | 158152 U1 | 12/2015 |
| UA | 1127544 C2 | 9/2000 |
| UA | 56238 U | 1/2011 |
| UA | 98015 C2 | 4/2012 |
| WO | 8404352 A1 | 11/1984 |
| WO | 2009060552 A1 | 5/2009 |
| WO | WO 2010133299 A1 | 11/2010 |
| WO | 2016132232 | 8/2016 |

* cited by examiner

TORQUE SHOULDER OF A PREMIUM CONNECTION

This application is a divisional of U.S. application Ser. No. 15/449,350, filed Mar. 3, 2017, now abandoned, the entire disclosure of which is hereby incorporated by reference.

The present invention relates to threaded pipes and connectors for such pipes which may be used in the oil and natural gas industry. For example, a pipe can have an end with a pin that fits into a box at one end of a connector, the pipe and connector being connected by threading. The connector can have a second box for a second pipe with a second pin, so that the pipe and the second pipe are connected via the connector.

BACKGROUND

WO Publication No. 84/04352 purportedly describes a tubular joint or connector of box and pin members having two-step tapered threads. Two metal to metal seals of complementary engaging sealing surfaces are provided. Reverse angle torque shoulders at the end of the pin member and the interior termination of the box member and hooked threads further characterize the joint and box and pin members.

U.S. Pat. No. 4,623,173 purportedly describes a screw joint coupling for oil pipes. A main sealing portion is provided with a sealing portion which is axially convex at an end of a male screw, and with a sealing portion which is tapered at an inner side of a female screw, and an end point of the male screw butting an end part of a stopper formed at the inner side of the female screw.

U.S. Pat. No. 4,624,488 purportedly describes a tubular connection that has cooperating internal frusto-conical sealing surfaces on a counterbore of the box member and a free end of the pin member. The internal sealing surface of the pin member inclines inwardly substantially at fourteen degrees from the axis of the tubular connection adjacent the end of the pin member. The angle of the incline of the box internal sealing surface is substantially the same as that of the pin internal surface. A pilot surface or bull nose disposed from a distal-proximate end to the distal end of the pin member inclining to a lesser extent than the angle of the incline of the internal surface of the pin member being substantially parallel to the axis of the connection; defines an increased end-of-pin flat thickness.

U.S. Pat. No. 7,334,821 purportedly describes a threaded tubular connection with a male threaded element and a female threaded element. The male threaded element has male threading and a free end, with a non-threaded lip between the threading and the free end. The female threaded element has an internal tapered female threading and a non-threaded portion between the female threading and a lug. The female threaded element comprises an annular axial abutment surface. After complete makeup of the male threading in the female threading, the free end bears against the annular axial abutment surface, which other bearing surfaces radially interfere and are under metal-metal contact pressure to constitute metal-metal sealing surfaces.

In the '821 patent, another axial abutment surface thus is formed on a front surface of the free end of the male threaded element, and a single lip sealing surface is disposed on the lip at an axial distance from the end of the threading. The lip comprises, between the distal axial abutment surface and the single lip sealing surface, an appendix having a peripheral surface facing the female threaded member that is distinct from the lip sealing surface.

U.S. Publication No. 2014/0145433 purportedly describes a tubular connection including a pin and box member. The pin member has a first thread structure and a helical torque shoulder spaced axially along the pin member from the first thread structure. The box member has a second thread structure and a second helical torque shoulder spaced axially along the box member from the second thread structure. Upon rotation, the helical torque shoulders engage one another.

SUMMARY OF THE INVENTION

During make-up of a premium connection between a threaded tube with a pin, such as a pipe, and a threaded tube with a box, such as a connector, the following sequence occurs: (1) the pin on the pipe is stabbed into the connector until thread crests touch; (2) the pin is then screwed into the box until the pin seal surface initially touches the box seal surface, to define a position referred to as "hand tight"; (3) the pin is further screwed into the box until an end of the pin, a so-called torque shoulder, just touches a corresponding torque shoulder on the box, to define a position referred to as "shoulder tight", with this additional turning from the hand tight to the shoulder tight positions causing an interference fit between the pin and box seals; and (4) then the pin is further tightened to create an additional torque to define a final made up position is referred to as "power tight".

A distance between the pin torque shoulder and box torque shoulder when the connection is at the hand tight position is called "standoff" The standoff is eliminated once the shoulder tight position is reached. A large standoff may be problematic because the pin seal surface and box seal surface are in contact while the standoff is being eliminated. If a large amount of turning is needed to reduce a large standoff, galling of the seal surfaces occurs, thereby compromising the seals.

An object of the present invention is to provide torque shoulder that secures or traps the pin in the box thereby reducing or eliminating movement of the pin with respect to the box. For example, the torque shoulders will prevent the pin from moving, bending or deforming in the radial direction.

An alternate or additional object is to provide a connection that is easy to manufacture.

The present invention provides a threaded tubular connection. The threaded tubular connection includes a pin having external threads, a pin seal surface, and a pin torque shoulder at a free end and a box for receiving the pin, the box having internal threads for interacting with the pin threads, a box seal surface for contacting the pin seal surface and a box torque shoulder for contacting the pin torque shoulder. The pin and box define a longitudinal axis. The pin torque shoulder has a first pin shoulder surface and a second pin shoulder surface, the first pin shoulder surface intersects an axis perpendicular to the longitudinal axis at a first angle and the second pin shoulder surface intersects the perpendicular axis at a second angle. The box torque shoulder has a first box shoulder surface and a second box shoulder surface. The first box shoulder surface intersects an axis perpendicular to the longitudinal axis at a third angle and the second box shoulder surface intersects the perpendicular axis at a fourth angle.

The present invention further provides another threaded tubular connection. The threaded tubular connection includes a pin, the pin having internal threads, a pin seal surface, and a pin torque shoulder at a free end and a box for receiving the pin, the box having external threads for interacting with the external threads, a box seal surface for contacting the pin seal surface and a box torque shoulder for contacting the pin torque shoulder. The pin and box define a longitudinal axis. The pin torque shoulder has at least one pin shoulder surface having a pin radius, the at least one pin shoulder surface is curved with respect to the longitudinal axis. The box torque shoulder has at least one box shoulder surface having a box radius, the at least one box shoulder surface is curved with respect to the longitudinal axis.

The present invention also provides a method for forming a threaded tubular connection. The method includes the steps of:

providing a pin having external threads, a pin seal surface and a pin torque shoulder at a free end, the pin torque shoulder including a first pin shoulder surface extending in a first direction and a second pin shoulder surface extending in a second direction, providing a box having internal threads, a box seal surface and a box torque shoulder at a free end, the box torque shoulder including a first box shoulder surface extending in a third direction and a second box shoulder surface extending in a fourth direction, stabbing the pin into the box to engage the external threads and internal threads with one another;

rotating the pin with respect to the box until the pin seal surface contacts the box seal surface; and further rotating the pin with respect to the box until the first box shoulder surface contacts the first pin shoulder surface and the second box shoulder surface contacts the second pin shoulder surface.

BRIEF DESCRIPTION OF THE DRAWINGS

A preferred embodiment of the present invention will be elucidated with reference to the following drawings, in which:

FIGS. 5 A and 5B show details of the torque shoulder according to the present invention and as shown in FIGS. 2A to 4;

DETAILED DESCRIPTION

Figure 1A:
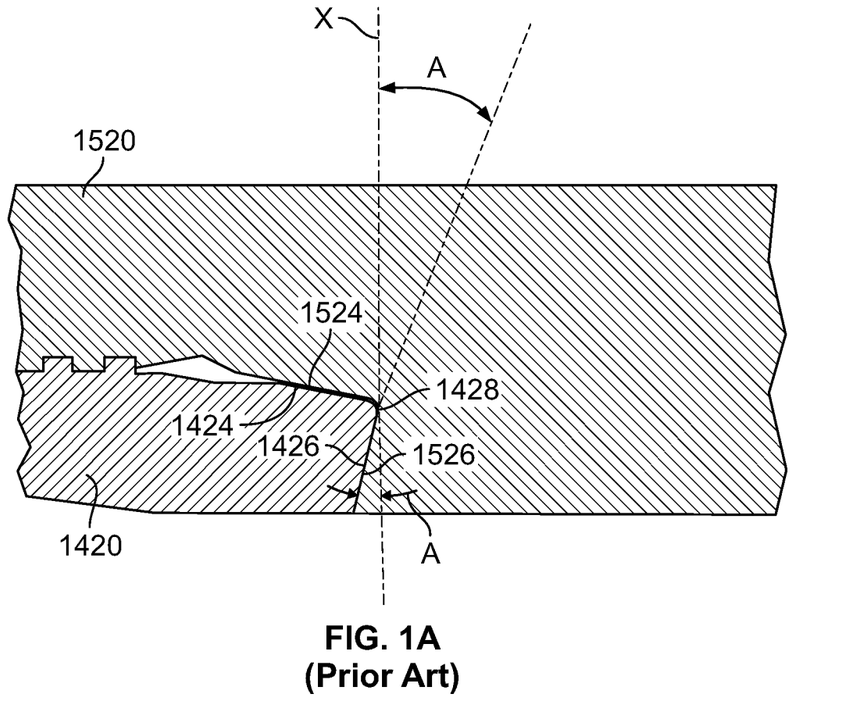
FIGS. 1A to 1D show details of a torque shoulder as known in the art.

FIG. 1A shows a traditional torque shoulder and metal-to-metal seal combination as known in the art. Box 1520 includes box seal surface 1524 and box torque shoulder 1526. Pin 1420 includes pin seal surface 1424, nose 1428 and pin torque shoulder 1426. As shown in FIG. 1, pin seal surface 1424 is located at an end of pin 1420. The nose 1428 of pin 1420 is wedged between pin seal surface 1424 and pin torque shoulder 1426 when the connection is formed. The connection of pin 1420 and box 1520 defines a longitudinal axis of the pipe and connector (not shown). An axis X is perpendicular to the longitudinal axis and runs through the end of the torque shoulders 1426, 1526 at pin nose 1428. Pin torque shoulder 1426 and box torque shoulder 1526 each include a single shoulder surface that is angled with respect to perpendicular axis X. An interior angle A formed between torque shoulders 1426, 1526 and perpendicular axis X may be, for example, approximately −15°, that is, 15° in the clockwise direction from axis X. This angle of incline is known in the prior art. In this example the pin nose 1428 is tightly wedged between box seal surface 1524 and box torque shoulder surface 1526. See for example, U.S. Pat. No. 7,334,821.

Figure 1B:
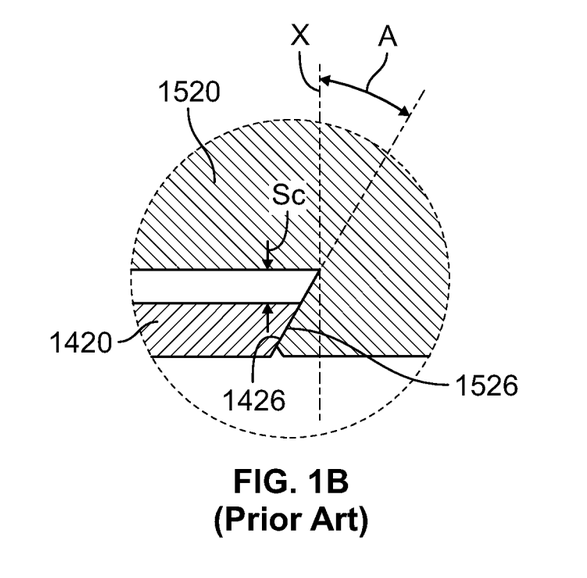
Figure 1C:
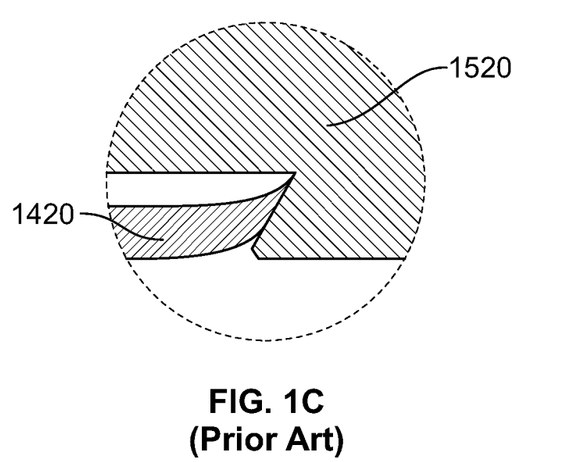
Figure 1D:
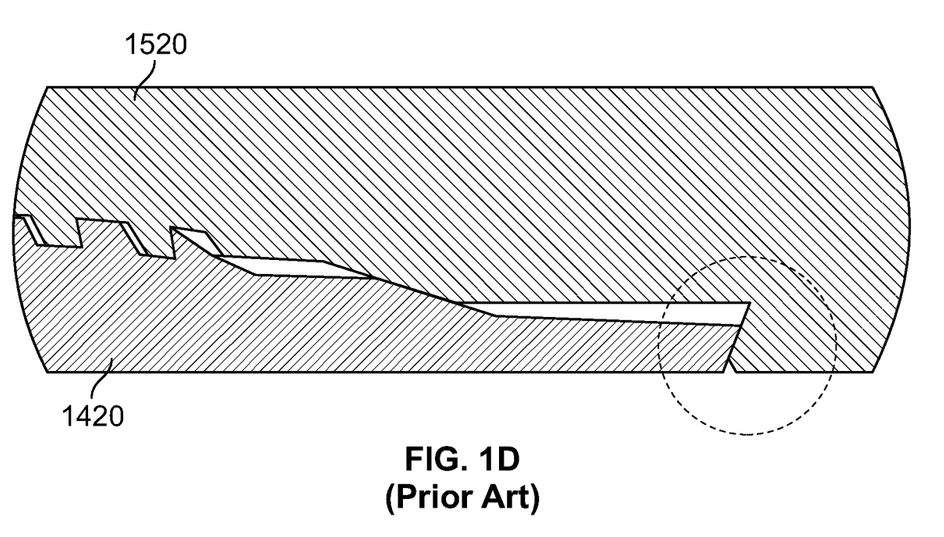

FIG. 1D shows a premium connection as known in the prior art. FIG. 1B shows a close up of the connection of FIG. 1D when the torque shoulders 1426, 1526 just begin to contact. A gap Sc exists between an outer surface of pin 1420 and a counter-bore surface of box 1520 and is necessary for ease of assembly. While angle A is beneficial to lock the pin 1420 and box 1520 together after assembly, FIG. 1C shows that, during further screwing of the connection, angle A causes the pin 1420 to crash into the box 1520. This undesirable contact can prevent proper positioning of the connection during assembly and may cause damage to seal surfaces 1424, 1524 or torque shoulders 1426, 1526.

Figure 2A:
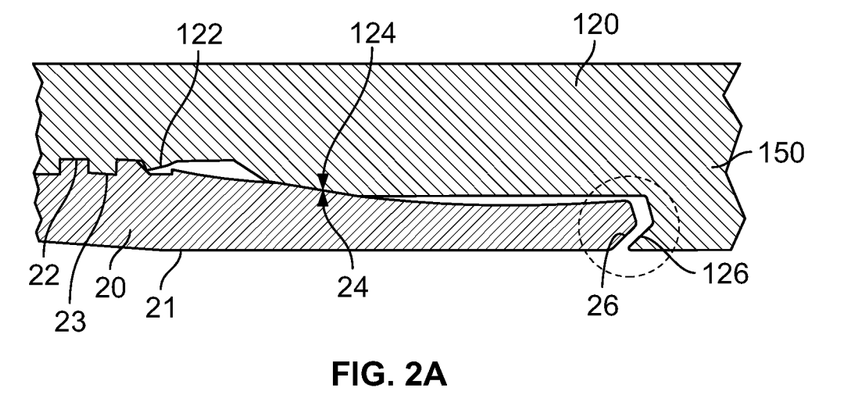
FIGS. 2A and 2B show a cross section view of a premium connection for an oil pipe according to the present invention, in a second stage of make-up, the hand tight position.
Figure 3A:
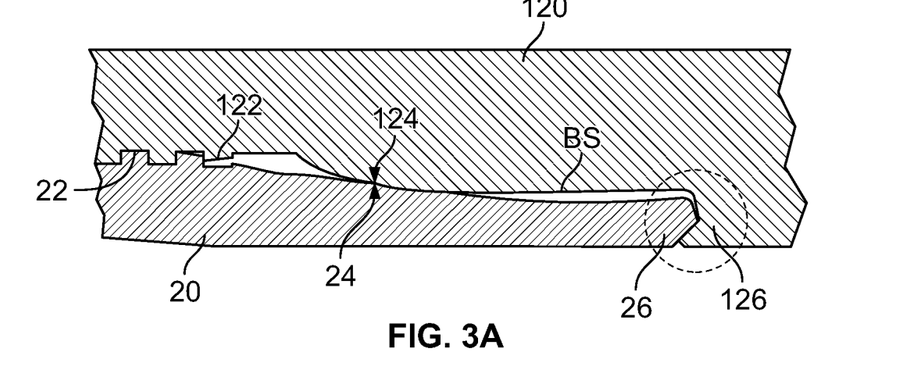
FIGS. 3A and 3B show the connection in a third stage of make-up, the shoulder tight position.
Figure 10A:
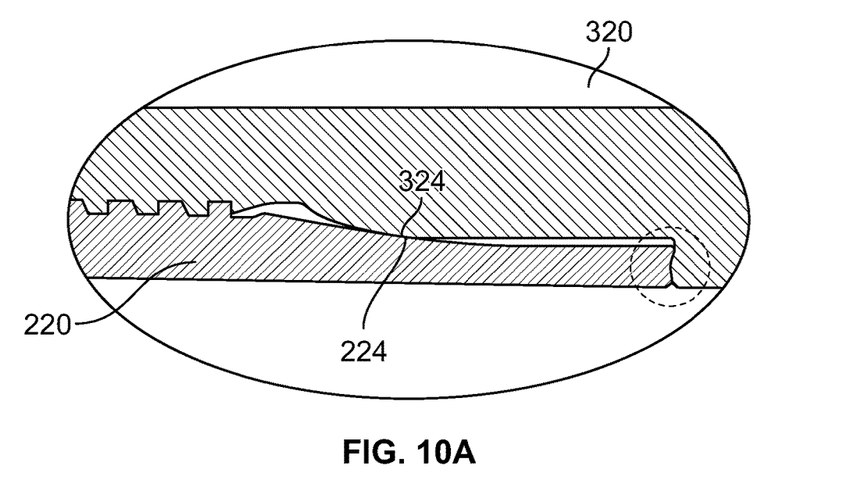
FIGS. 10A and 10B show a further preferred embodiment of a torque shoulder according to the present invention.

In accordance with the present invention, a premium connection is provided that includes advantages over the prior art, for example, movement of the pin may be controlled and the undesirable contact and damage to seal surfaces discussed above may be reduced. The premium connection includes pin and box torque shoulders with a plurality of surfaces, for example, each torque shoulder may have a top and bottom torque shoulder surface with respect to the orientation shown in FIGS. 2A to 11B. Another feature according to the present invention also includes seal surfaces that are spaced apart from the shoulder surfaces as shown in FIGS. 2A, 3A and 10A. A further feature includes a space existing between an edge of the pin and an edge of the box or connector even after the pin is in a final position. See FIGS. 5A and 6 to 8 and 10A.

In a preferred embodiment, both torque shoulders, top and bottom, of the pin and box may contact each another at the same time. Thus, the connector provides a neutral trap for the pin. In another preferred embodiment, top torque shoulder surfaces of the pin and box may contact one another prior to bottom torque shoulder surfaces of the pin and box contacting one another. In this embodiment, the pin may bend downward. See FIG. 6. In a further preferred embodiment, bottom torque shoulder surfaces of the pin and box may contact one another prior to the top torque shoulder surfaces of the pin and box contacting one another. In this embodiment, the pin may bend upward. See FIGS. 2B and 3B. As a result, the movement of the pin can be controlled as desired.

Figure 2B:
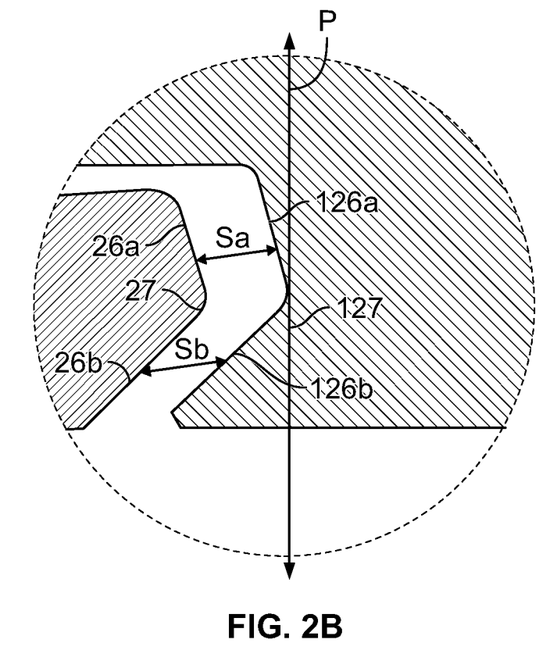
Figure 4:
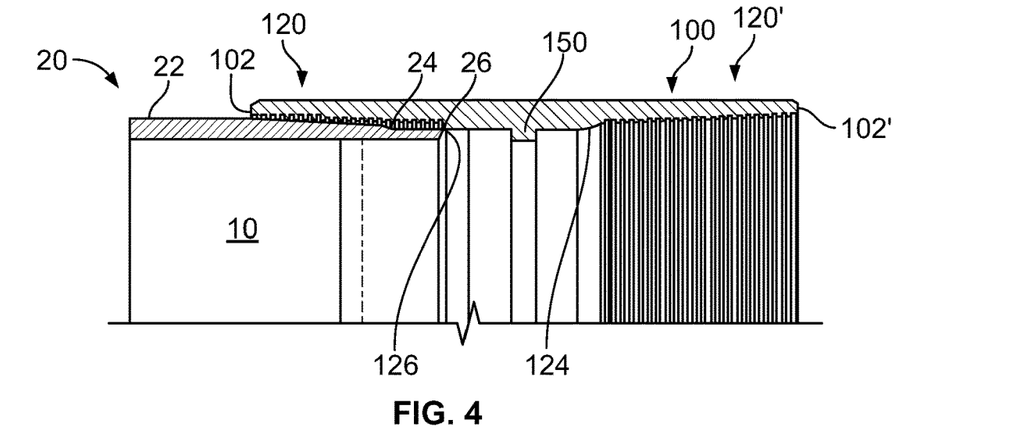
FIG. 4 shows a cross section view of a premium connection for an oil pipe according to the present invention, a pin of the oil pipe being stabbed into a box of the connector.

FIG. 4 shows a cross section view of an oil pipe 10 and a connector 100, in a first stage, the stabbed position. FIGS. 2A and 2B show the connection with oil pipe 10 and connector 100, in a second stage, after rotation has occurred. Oil pipe 10 has a pin 20 with a threaded section 22, a pin seal surface 24 and a torque shoulder 26 at a free end. Pin torque shoulder 26 includes first surface 26a and second surface 26b. Connector 100 has two boxes 120, 120'. Each box 120, 120' has a threaded section 122, a box seal surface 124 and a torque shoulder 126 on a radially inwardly projection 150. Box torque shoulder 126 includes first surface 126a and second surface 126b. In this embodiment, the first box shoulder surface 126a is complementary with the first pin shoulder surface 26a and the second box shoulder surface 126b is complementary with the second pin shoulder surface 26b.

Connector 100 has two free ends 102 and 102' as shown in FIG. 4. As described above, in the stabbed position, oil pipe 10 is stabbed or placed into connector 100 until threaded section 22 of pin 10 contacts threaded section 122 of boxes 120, 120'. Rotation has not yet occurred between pin 10 and boxes 120, 120'. The rotation of pin 10 and boxes 120, 120' forms the connection.

This second stage of makeup is known as the hand tight position in which the threads 22, 122 or seal surfaces 24, 24 just begin to touch one another. Threads 22 of pin 20 engage threads 122 of box 120. Pin seal surface 24 and box seal surface 124 just begin to touch. A gap or standoff "Sa" exists between the first surfaces 26a, 126a of pin torque shoulder 26 and box torque shoulder 126 and a gap or standoff "Sb" exists between the second surfaces 26b, 126b of pin torque shoulder 26 and box torque shoulder 126 in the hand tight position. In this embodiment, the standoff Sa is, for example, approximately 0.060 in. and the standoff Sb is, for example, approximately 0.030 in. The standoffs Sa and Sb may vary as a result of the designed seal interference and seal angles and do not have to be equal.

A nose 27 extends at an end of pin 20. Nose 27 is located between an inner surface 21 and an outer surface 23 of pin 20 and along a length of torque shoulder 26 in a direction of axis P, an axis that is perpendicular to the longitudinal axis. The nose 27 is a vertex connecting first surface 26a and second surface 26b of torque shoulder 26. In this embodiment, first surface 26a extends in one direction from outer surface 23 to nose 27 and in a second direction around an outer circumference of pipe 10. Second surface 26b extends in one direction from inner surface 21 to nose 27 and in a second direction around an inner circumference of pipe 10. The location of nose 27 is different from the position of nose 1428 shown in FIG. 1A. In FIG. 1A, the nose is located at one end of the torque shoulder 1426 at an outer surface of the pin 1420 and at or near the pin seal surface 1424. As shown in FIGS. 2A to 11, nose 27 is not located at one end of the pin torque shoulder 26. Instead nose 27 is in a middle or central part of pin torque shoulder 26 with regard to a length of shoulder 26 in the profile view. The shape of nose 27 may vary and can be, for example, angular, socket, a flattened edge, a bull nose, bulb, cone, rounded, fishtail, etc. A depression 127 is located along a length of torque shoulder 126 in a direction perpendicular to the longitudinal axis and is a vertex connecting first surface 126a and second surface 126b. In this embodiment, the geometry of nose 27 and depression 127 are complementary so nose 27 and depression 127 fit together when pin 10 is screwed into connector 100; depression 127 contacts nose 27 and pin shoulder 26 contacts box shoulder 126. (FIG. 5).

Figure 3B:
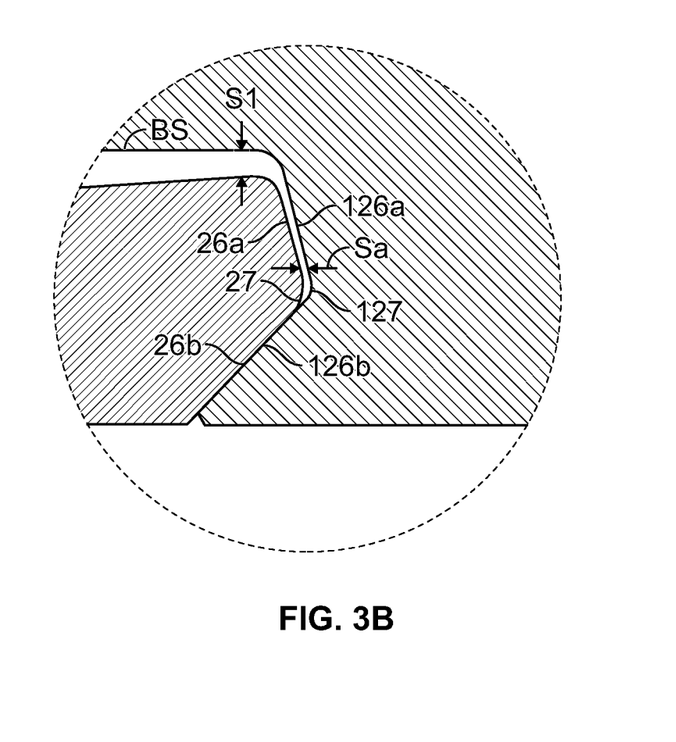

The difference in width between standoff Sa and standoff Sb occurs because nose 27 is not initially aligned with depression 127 with respect to the longitudinal axis. As shown in FIGS. 2B and 3B, nose 27 is situated below depression 127. This offset between nose 27 and depression 127 forces pin 10 to bend upwards as nose 27 is received in depression 127. Bending pin 10 forces nose 27 into depression 127 and results in a tighter connection. In a different embodiment, nose 27 may be situated above depression 127 so the pin is forced to bend downwards thereby also resulting in a tighter connection. See, for example, FIG. 6.

FIGS. 3A and 3B show the third stage of make-up, a first shoulder tight position, which occurs after further rotation of pin 20 with respect to box 120. The seal surfaces 24, 124 are forced together by screwing pin 20 into box 120 until torque shoulders 26, 126 contact one another. In this preferred embodiment, for example, the complementary second surfaces 26b, 126b just contact one another. As a result, the standoff Sb between second surfaces 26b, 126 is eliminated. However, standoff Sa between complementary first surfaces 26a, 126a still exists. Additional rotation has not yet occurred after the point of contact between shoulders 26, 126 so there is no additional torque force applied to shoulders 26, 126, in this position. A distance 51 in the radial direction exists between the edge of pin 20 and surface BS of box 120. The relative angles of seal surfaces 24, 124, force apart an edge of pin 20 and surface BS of box 120 by an amount of seal interference 51 designed into the connection to provide sufficient contact pressure in order to form a leak tight seal.

The fourth stage of make-up, a second shoulder tight position, occurs after further rotation of pin 20 with respect to box 120. The seal surfaces 24, 124 are further forced together by screwing pin 20 into box 120 until torque shoulder first surfaces 26a, 126a contact one another. The radial distance 51 is reduced by the amount of the radial offset between vertices 27, 127. Forcing the end of the pin radially outward forces the seal surfaces 24,124 tighter together creating a better seal. The V shape between the first and second shoulder surfaces keeps gap 51 from being zero and causing undesirable contact between the box and pin.

The fifth and final stage of making up the connection is the power tight position. During the power tight stage additional torque is applied to torque shoulders 26, 126 but very little additional rotation occurs, about 0.01 turns, for example. Because very little additional rotation occurs, the power tight position for the connection looks like the shoulder tight position shown in FIGS. 3A and 3B.

The amount of torque build up is a function of friction, stiffness of the pin, stiffness of the box around the seal area, the amount of thread interference, if any, the lubricant and the amount of interference in the seals. Once seal surfaces 24, 124 contact each other, torque begins to build up rapidly. The torque build up is caused by seal surfaces 24, 124 being wedged together. The torque continues increasing at an approximately constant rate until the shoulders 26, 126 contact in the shoulder tight position. The torque builds up extremely rapidly after shoulders 26, 126 contact one another. Once shoulders 26, 126 contact, additional torque is applied until the pre-determined power tight position is reached and the desired amount of torque is achieved. Very little additional rotation of the connection is needed to reach the desired final make-up torque, for example, approximately 0.01 turns.

Figure 5A:
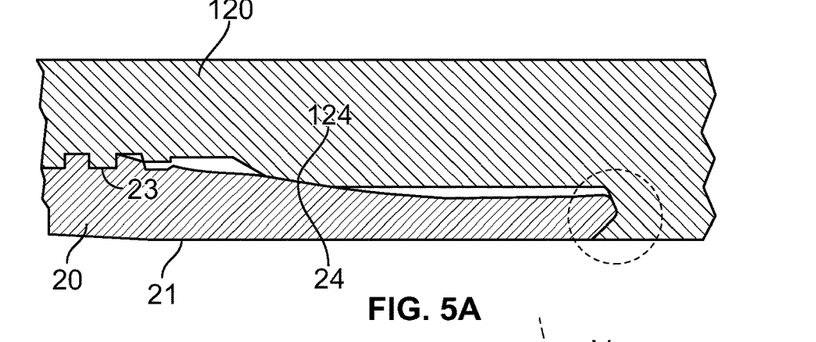
Figure 5B:
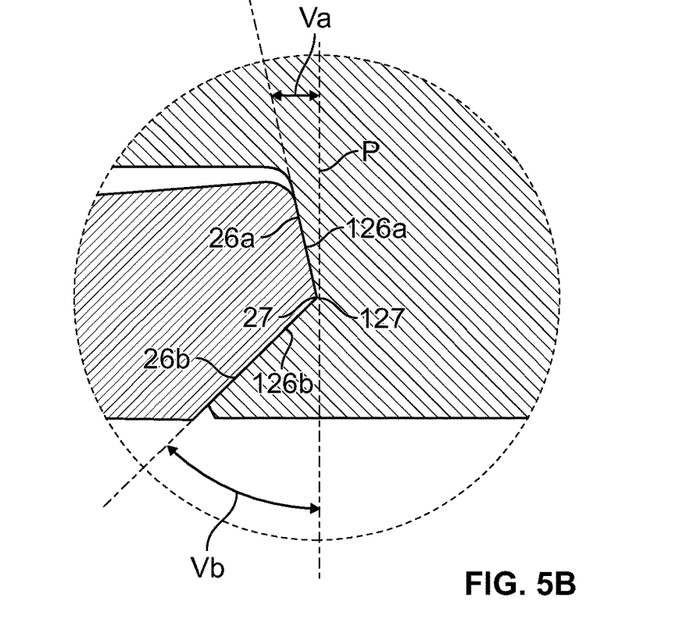

FIGS. 5A and 5B shows a cross section view of a torque shoulder embodiment in accordance with the present invention. As shown in FIGS. 5A and 5B, in the embodiment of FIGS. 2A to 4, pin 20 is designed as a male component and box 120 is designed as a female component so box 120 can receive pin 20. In this embodiment, pin torque shoulder 26 and box torque shoulder 126 both have a V-shaped cross section. Pin seal surface 24 and box seal surface 124 are spaced apart from each respective torque shoulder 26, 126, with respect to a longitudinal axis (not shown) defined by the connection of the pipe and connector. Torque shoulders may also have cross sections of another shape or design.

The V shaped extension of pin torque shoulder 26 engages with the V shaped receptacle of box torque shoulder 126 to reduce or prevent movement of pin 20 in multiple directions, e.g., radially inward or outward. For example, first surfaces 26a, 126a prevent pin 20 from being driven upwards into a corner of box 120 by keeping the nose 27 of pin 20 down. And, second surfaces 26b, 126b prevent externally applied pressure from forcing pin 20 inward which de-energizes seal surfaces 24, 124.

An interior angle Va is formed between first surfaces 26a, 126a and axis P. Interior angle Va may be 15°, which is 15° in the counter-clockwise direction with respect to axis P. An interior angle Vb is formed between second surfaces 26b, 126b and axis P. Interior angle Vb may be −15°, which is 15° in the clockwise direction with respect to axis P. Angles Va, Vb may vary and be, for example, from 3 to 60°, −3 to −60°, respectively. In addition, interior angle Va may be different from or equal to an absolute value of interior angle Vb. For example, as shown in FIG. 5B, angle Va is 15° and is not equal to an absolute value of angle Vb which is −45° because 15°≠|−45°| so Va≠|Vb|. In another example, angle Va may be 20° and angle Vb may be −10° in which case Va≠|Vb| because 20°≠|−10°|.

As shown in FIG. 5B, nose 27 and depression 127 are located at or near a center torque shoulders with respect to a length of shoulders 26a, 26b, 126a, 126b in the direction of axis P. First pin surface 26a has the same or near similar length to second pin surface 26b and first box surface 126a has the same or similar length to second box surface 126. In the FIG. 5B embodiment, nose 27 and depression 127 serve as the vertex of interior angles Va, Vb however, this is a non-limiting example of a preferred embodiment. The geometry of torque shoulders 26, 126 including nose 27, depression 127 and angles Va, Vb is variable. Different shapes and positions of vertices may be used. Different shapes or angles of surfaces 26a, 26b, 126a, 126b or Va, Vb may be used. For example, the position of nose 27 does not have to be in a center of torque shoulder 26 but instead could be located closer to inner surface 21 than outer surface 23.

Figure 6:
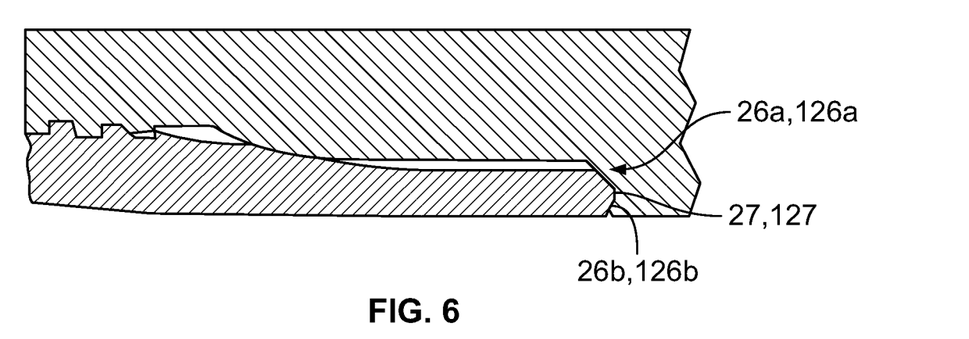
FIGS. 6 to 8 show details of additional embodiments of torque shoulders according to the present invention.
Figure 7:
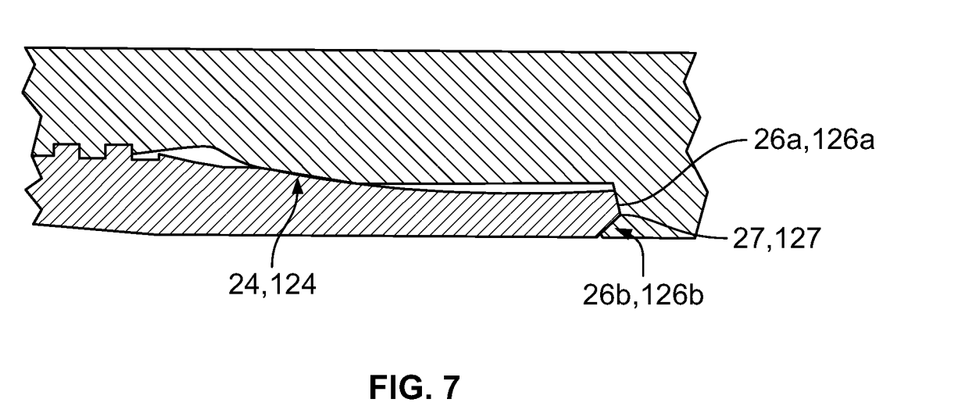

As shown in another preferred embodiment in FIG. 6, first surfaces 26a, 126a are longer than second surfaces 26b, 126b and first angle Va is greater than the absolute value of second angle Vb. FIG. 7 shows first surfaces 26a, 126a are shorter than second surfaces 26b, 126b and first angle Va is less than second angle Vb. The geometry of first surfaces 26a, 126a, second surfaces 26b, 126b and vertices (nose, depression) 27, 127 are designed to produce the desired results. As discussed above, the vertices 27, 127 may be initially mis-aligned to force an end of the pin down in order to straighten out or minimize bending of the pin, for example. Or, for example, the end of pin 20 may need to be forced up in order to increase contact pressure on the seals 24, 124.

Figure 8:
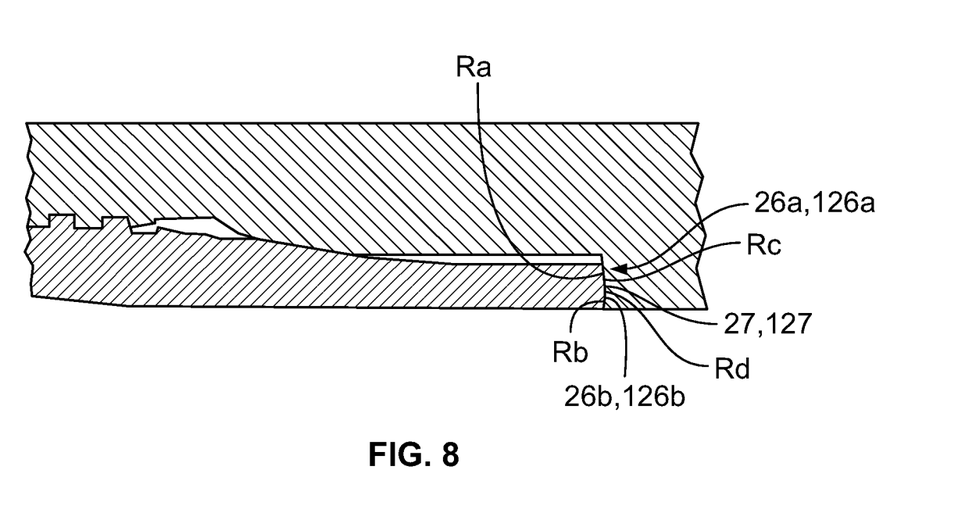

FIG. 8 shows another preferred embodiment of torque shoulders 26, 126 in which the shoulders 26, 126 have a bullet, bull nose or curved shape cross section as opposed to the V shaped cross section shown in FIGS. 5 to 7. First surface 26a has a first radius Ra, second surface 26b has a second radius Rb, first surface 126a has a third radius Rc and second surface 126b has a fourth radius Rd. First and third radii Ra, Rc, may be different from or equal too second and fourth radii, respectively Rb, Rd. Nose 27 is located between first surface 26a and second surface 26b. Depression 127 is located between first surface 126a and second surface 126b. As discussed above with respect to the V-shaped cross section embodiment, first surfaces 26a, 126a, second surfaces 26b, 126b and radii Ra, Rb, Rc, Rd and vertices may be adjusted to force pin 20 up or down to trap pin 20 in a desired position with respect to the box 120. In another embodiment the pin may having a single surface with a single radius and the box may have a single surface with a single radius. In this embodiment, the pin radius and box radius may or may not be equal and centerlines of the radii may or may not be the same distance from the axis. If the two radii are offset radially with respect from each other then the end of the pin will be either forced upwards or downwards, depending upon how the two radii are offset.

The V shaped cross section and bull nose cross section designs of torque shoulders 26, 126 is advantageous over the prior art because the male and female geometry traps or constrains pin in a radial position within the box and thereby reducing or preventing movement of the pin. By adjusting the design of shoulders 26, 126, bending, bowing or deflection of the pin may be compensated for or minimized. In addition, the contact pressure of the seal surfaces 24, 124 maybe increased. Other benefits may be derived therefrom as well.

Figure 9:
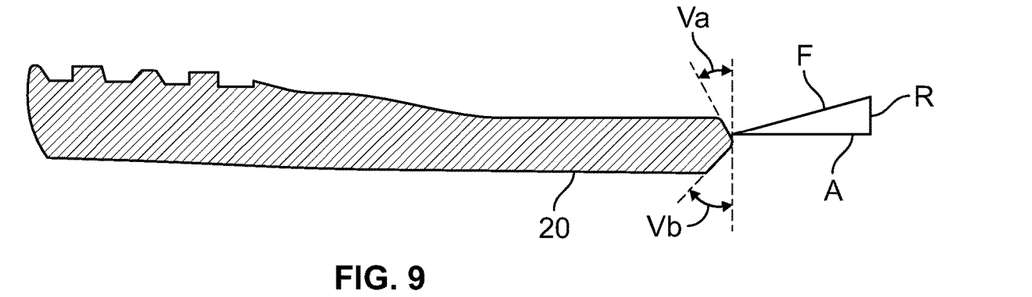
FIG. 9 shows a force diagram of the forces applied to a pin in accordance with the embodiment shown in FIG. 5A and b.

Preferably, first and second angles Va, Vb or first and second radii Ra, Rb are designed to be small enough so a larger component of force F acting on pin 20 is an axial component A and not a radial component R. See FIG. 9.

Figure 10B:
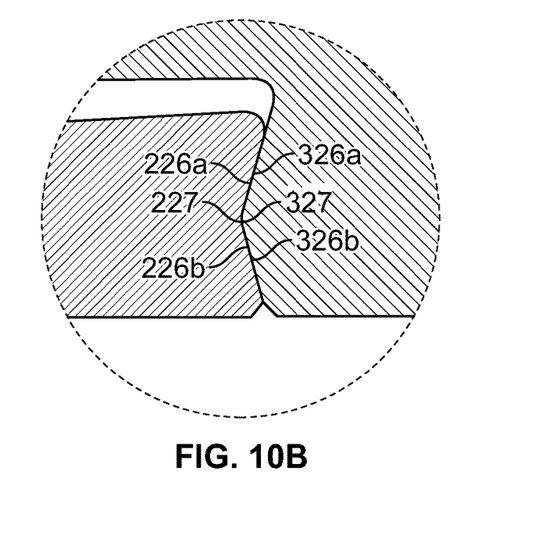

FIGS. 10A and 10B show a torque shoulder connection for a pin and box in which the V-shaped shoulder design is inverted compared to the embodiments shown in FIGS. 2A to 9. In this embodiment, pin 220 is a female member and box 320 is a male member. Box 320 includes a box seal surface 324, first shoulder surface 326a, second shoulder surface 326b. A nose 327 is formed between first shoulder surface 326a and second shoulder surface 326b. Pin 220 includes a pin seal surface 224, first shoulder surface 226a and a second shoulder surface 226b. A depression 227 is formed between first shoulder surface 226b and second shoulder surface 226b. In this embodiment, the vertex between box surfaces 326a and 326b forms nose 327 and the vertex between pin surfaces 226a and 226b forms depression 227. Nose 327 and depression are complementary surfaces so nose 327 is received in depression 227 by rotation of pin 220 in box 320 in the same manner as discussed above with respect to FIGS. 2a to 5B. This inverted shoulder design may also apply to the bull nose embodiment shown in FIG. 8.

Figure 11A:
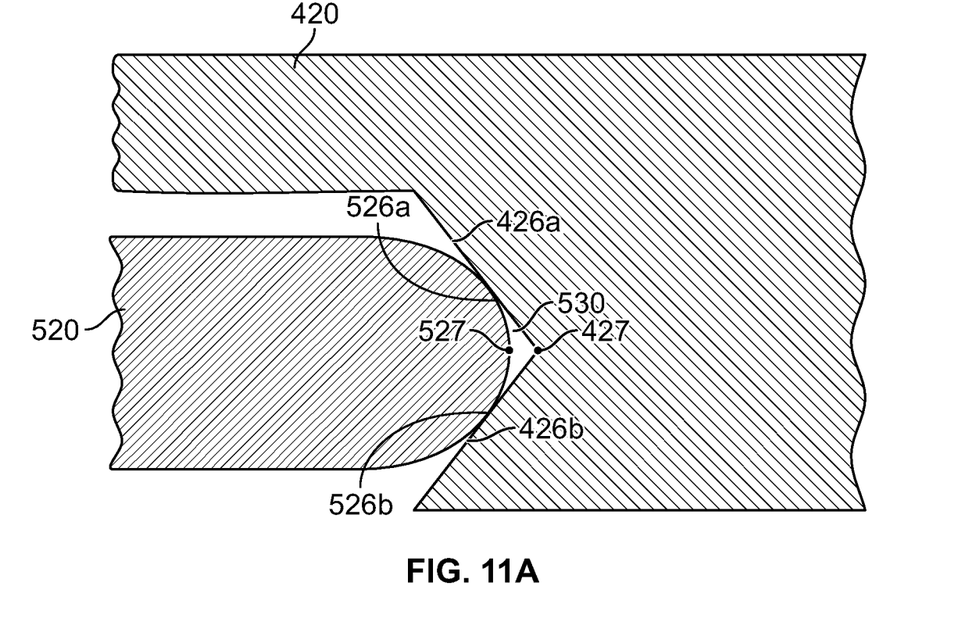
FIGS. 11A and 11B show another preferred embodiment of a torque shoulder according to the present invention.
Figure 11B:
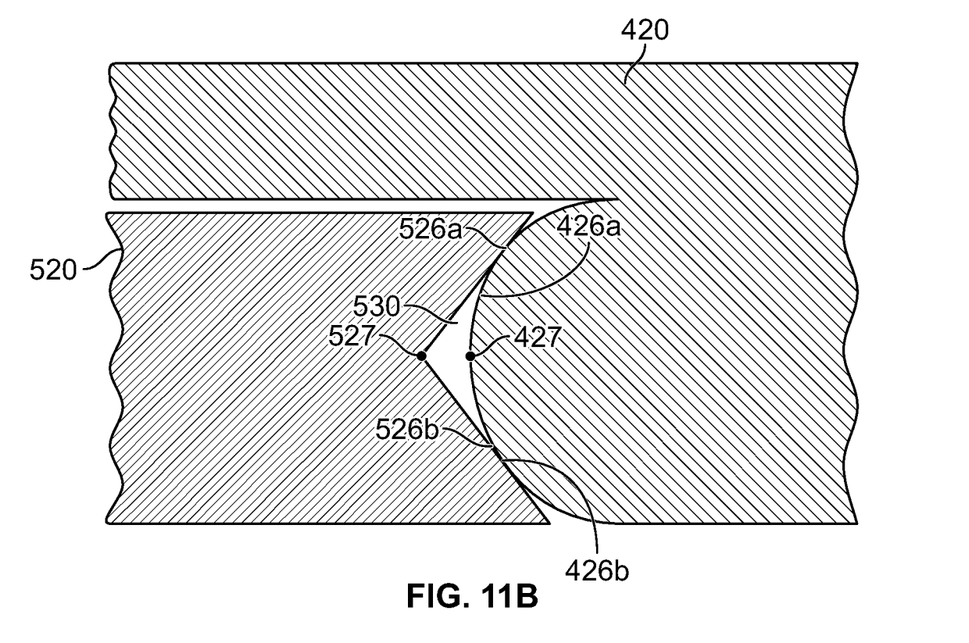

FIGS. 11A and 11B show a torque shoulder connection wherein the pin 520 and box 420 have different shoulder surface geometries and vertices 527 and 427 are not complementary with one another according to a further preferred embodiment of the present invention. FIG. 11A shows a pin 520 having a rounded or bull nosed shoulder surface 526 with a first shoulder surface 526a and a second shoulder surface 526b. A vertex 527 is located between the first shoulder surface 526a and second shoulder surface 526b. Box 420 includes a v-shaped box shoulder surface 426 with a first shoulder surface 426a and second shoulder surface 426b. A vertex 427 is located between the first shoulder surface 426a and second shoulder surface 426b. Pin 520 and box 420 contact one another in the same manner as described above with respect to FIGS. 2A to 5B. Rotation of pin 520 into box 420 provides for contact of first shoulder surface 526a with first shoulder surface 426a and for contact of second shoulder surface 526b with second shoulder surface 426b. In the embodiments shown in FIGS. 11A and 11B, vertex 427 and vertex 527 may not be in contact with one another due to the different surface geometries of shoulder 526 and shoulder 426. A gap or space 530 will be present between vertices 426, 526 after makeup. Also, due to the variation in geometry and design of shoulder surfaces 526, 426, shoulder surfaces 526, 426 will not be in contact with one another along a portion of surfaces 526, 426.

FIG. 11B shows a pin 520 having a v-shaped pin shoulder surface 526 and a box 420 with a rounded or bull nosed box shoulder surface 426. Pin shoulder surface 526 has a first shoulder 526a and a second shoulder surface 526b. A vertex 527 is located between the first shoulder surface 526a and second shoulder surface 526b. Box shoulder surface 426 has a first shoulder surface 426a and second shoulder surface 426b. A vertex 427 is located between the first shoulder surface 426a and second shoulder surface 426b. Pin 520 and box 420 contact one another in the same manner as described above with respect to FIGS. 2A to 5B and 11A. Rotation of pin 520 into box 420 provides for contact of first shoulder surface 526a with first shoulder surface 426a and for contact of second shoulder surface 526b with second shoulder surface 426b. A space 530 is present between vertices 427 and 527.

In FIGS. 11A and 11B, the pin 520 and box 420 may be designed so that vertices 527 and 427 are aligned with each other so pin shoulder surfaces 526a, 526b contact box shoulder surfaces 426a, 426b at the same time when pin 520 is being inserted into box 420 during make-up. Alternatively, the shoulder surfaces 526, 426 and vertices 527, 427 may be designed so first shoulder surfaces 526a, 426a contact first, then second shoulder surfaces 526b, 426b contact as pin 520 is further screwed into box 520. In another variation, the shoulder surfaces 526, 426 and vertices 527, 427 may be designed so second shoulder surfaces 526b, 426b contact first, then first shoulder surfaces 526a, 426a contact as pin 520 is further screwed into box 520.

Shoulder surfaces 426, 526 may be designed with a variety of geometries, including, but not limited to, bull nose, bullet shaped, angular, rounded or fishtail, for example.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A threaded tubular connection comprising:
a pin, the pin having external threads, a pin seal surface, and a pin torque shoulder at a free end; and
a box for receiving the pin, the box having internal threads for interacting with the external threads, a box seal surface for contacting the pin seal surface and forming a seal, and a box torque shoulder for contacting the pin torque shoulder, the pin seal surface being axially spaced apart from the pin torque shoulder, wherein a gap is formed between the pin and box between the seal and the pin torque shoulder;
the pin and box defining a longitudinal axis,
the pin torque shoulder formed by one continuous arc, the pin torque shoulder having a pin geometry which includes a first curved outwardly facing pin shoulder surface and a second curved inwardly facing pin shoulder surface, the first pin shoulder surface and the second pin shoulder surface meeting at a pin vertex defining a nose, and
the box torque shoulder formed by two linear portions meeting at a box vertex defining a receptacle and having a box geometry which includes a first inwardly facing box shoulder surface and a second outwardly facing box shoulder surface, the first box shoulder surface and the second box shoulder surface meeting at the box vertex,
wherein the pin geometry is not complementary with the box geometry.

2. The threaded tubular connection of claim 1, wherein the pin geometry is rounded and the box geometry is V-shaped.

3. The threaded tubular connection of claim 1, wherein the pin geometry is bull nosed and the box geometry is V-shaped.

4. The threaded tubular connection as recited in claim 1, wherein the pin vertex and the box vertex are spaced apart by the gap.

5. A method for forming a threaded tubular connection comprising the steps of:
providing a pin having external threads, a pin seal surface and a pin torque shoulder at a free end, the pin torque shoulder formed by one continuous arc, the pin torque shoulder including a pin geometry having a first curved outwardly facing pin shoulder surface and a second curved inwardly facing pin shoulder surface meeting at a pin vertex defining a nose,
providing a box having internal threads, a box seal surface and a box torque shoulder at a free end, the box torque shoulder formed by two linear portions meeting at a box vertex defining a receptacle and including a box geometry having a first inwardly facing box shoulder surface and a second outwardly facing box shoulder surface meeting at a the box vertex, the pin seal surface being axially spaced apart from the pin torque shoulder, wherein the pin geometry is not complementary with the box geometry;
stabbing the pin into the box to engage the external threads and internal threads with one another;
rotating the pin with respect to the box until the pin seal surface contacts the box seal surface to form a seal; and
further rotating the pin with respect to the box until the box shoulder surface contacts the pin shoulder surface;
wherein a gap is formed between the pin and box between the seal and the pin torque shoulder and a gap is formed between the pin vertex and the box vertex.

6. A threaded tubular connection comprising:
a pin, the pin having external threads, a pin seal surface, and a pin torque shoulder at a free end; and
a box for receiving the pin, the box having internal threads for interacting with the external threads, a box seal surface for contacting the pin seal surface and forming a seal, and a box torque shoulder for contacting the pin torque shoulder, the pin seal surface being axially spaced apart from the pin torque shoulder, wherein a gap is formed between the pin and box between the seal and the pin torque shoulder;
the pin and box defining a longitudinal axis,
the pin torque shoulder formed by two linear portions meeting at a pin vertex defining a receptacle, the pin torque shoulder having a pin geometry which includes a first outwardly facing pin shoulder surface and a second inwardly facing pin shoulder surface, the first pin shoulder surface and the second pin shoulder surface meeting at the pin vertex, and
the box torque shoulder formed by one continuous arc and having a box geometry which includes first curved inwardly facing box shoulder surface and a second curved outwardly facing box shoulder surface, the first box shoulder surface and the second box shoulder surface meeting at a box vertex defining a nose, wherein the pin geometry is not complementary with the box geometry.

7. The threaded tubular connection of claim 6, wherein the box geometry is rounded and the pin geometry is V-shaped.

8. The threaded tubular connection of claim 6, wherein the box geometry is bull nosed and the pin geometry is V-shaped.

9. The threaded tubular connection as recited in claim 6, wherein the pin vertex and the box vertex are spaced apart by the gap.

10. A method for forming a threaded tubular connection comprising the steps of:

provuding a pin having external threads, a pin seal surface and a pin torque shoulder at a free end, the pin torque shoulder formed by two linear portions meeting at a pin vertex defining a receptacle, the pin torque shoulder including a pin geometry having a first linear outwardly facing pin shoulder surface and a second linear inwardly facing pin shoulder surface meeting at the pin vertex, providing a box having internal threads, a box seal surface and a box torque shoulder at a free end, the box torque shoulder formed by one continuous arc and including a box geometry which includes first curved inwardly facing box shoulder surface and a second curved outwardly facing box shoulder surface, the first curved inwardly facing box shoulder surface and the second curved outwardly facing box shoulder surface meeting at a box vertex defining a nose, the pin seal surface being axially spaced apart from the pin shoulder, wherein the pin geometry is not complementary with the box geometry;

stabbing the pin into the box to engage the external threads and internal threads with one another;

rotating the pin with respect to the box until the pin seal surface contacts the box seal surface to form a seal; and further rotating the pin with respect to the box until the box shoulder surface contacts the pin shoulder surface;

wherein a gap is formed between the pin and box between the seal and the pin torque shoulder and a gap is formed between the pin vertex and the box vertex.

\* \* \* \* \*